4,161,349

United States Patent [19]
Norman

[11] 4,161,349
[45] Jul. 17, 1979

[54] BEAM SEPARATING PRISM SYSTEM

[75] Inventor: John B. Norman, Irving, Tex.

[73] Assignee: Recognition Equipment Incorporated, Dallas, Tex.

[21] Appl. No.: 885,707

[22] Filed: Mar. 13, 1978

[51] Int. Cl.² ............................................. G02B 27/14
[52] U.S. Cl. ..................................... 350/173; 358/55
[58] Field of Search ............. 350/173, 172, 166, 171, 350/311; 358/50, 55, 5

[56] References Cited
U.S. PATENT DOCUMENTS

| | | | |
|---|---|---|---|
| 3,602,637 | 8/1971 | Katsuta | 350/173 |
| 3,659,918 | 5/1972 | Tau | 350/173 |
| 3,802,763 | 4/1974 | Cook et al. | 358/55 |
| 4,009,941 | 3/1977 | Verdi, Jr. et al. | 358/55 |
| 4,035,836 | 7/1977 | Miyaji et al. | 358/55 |
| 4,072,405 | 2/1978 | Ozeki | 358/55 |

*Primary Examiner*—John K. Corbin
*Assistant Examiner*—B. W. de los Reyes
*Attorney, Agent, or Firm*—John E. Vandigriff; Thomas W. DeMond

[57] ABSTRACT

A beam separating prism system for an imaging system having two pairs of prisms, each prism having a 30, 60, and 90 degree triangular cross section and being provided with a partially reflecting region situated between the common boundary of the pair. A nonreflecting entry surface of one pair receives light which is both not focused and not parallel as reflected from a document. The light received at the entry surface is separated into three light components by the prism system. The exit axes of two light components are parallel and the exit axis of the third light component is at an angle of approximately 60 degrees to the other exit axes. The light is received by the pair of prisms having the entry surface and intercepted by the partially reflecting region of the pair. The remaining light is transmitted by the partially reflecting region to form a first component which is then reflected along an exit axis. The light reflected by the partially reflecting region is deflected by the rear of the entry surface toward the other pair of prisms at an angle of approximately 60 degrees to the partially reflecting region of that other pair of prisms. The light received by that partially reflecting region is both reflected and transmitted to form the other two light components. These components are reflected by total reflecting surfaces of the prism pair along parallel axes. Thus, the light originally received by the prism system is separated into three light components or beams which are directed along two axes which are parallel and one axis which is at an angle of approximately 60 degrees to the other two axes.

16 Claims, 2 Drawing Figures

BEAM SEPARATING PRISM SYSTEM

BACKGROUND OF THE INVENTION

1. Field of the Invention

This invention relates to a prism optical system for an imaging system, and, more particularly, a prism system provided with partially reflecting regions which are selective reflecting mirrors capable of splitting light into different light components.

2. DESCRIPTION OF THE PRIOR ART

Generally the art of splitting light reflected from an object into different beams and especially into three primary color components has mainly been confined to the field of color television cameras. The known types of such optical systems include those that utilize dichroic mirrors, color separating mirrors, dichroic regions, or dichroic layers. It is known to use several of these mirrors or regions in order to split the original light into three primary color components. Particularly the prism systems using dichroic layers are compatible with a basically compact optical construction because they are adapted for utilization within the confines of a color television camera. Reference is made to the following United States Patents:

U.S. Pat. No. 3,922,069 issued to Kishikawa on Nov. 25, 1975 and entitled "Color Separating Prism System;" and U.S. Pat. No. 4,035,836 issued to Miyaii on July 12, 1977 and entitled "Prism Optical System for a Color Television Camera".

Both Kishikawa and Miyaji show prism systems which are adapted for utilization within a television camera. Basically both patents show systems separating light received from an optic system, which ensures that the light rays are parallel, into three color components of parallel light. The typical color television camera has three image pickup tubes each of which receives one of the color components. The placement within the camera of the pickup tubes is determined by the exit axis of the light components; therefore, the pickup tubes may be located at any appropriate location within the camera as long as they do not interfer with the function of the optic system which directs the light into the color separating prism system.

Kishikawa shows a prism system which has two prisms spaced by a third prism with dichroic layers or regions separating the intermediate prism from the other prisms. The surfaces of the intermediate prism and their associated dichroic regions are not parallel. Each of the dichroic regions reflects a different light component. Thus, two of the three light components are reflected back towards the entry surface and are reflected by the rear of the entry surface. The third light component formed is along the same optical axis as the light entering the prism system because this component is not reflected by either of the dichroic regions.

The Miyaji Patent is also adapted for utilization within a television camera system. It also three prisms of which two are separated by a third prism. Dichroic layers are situated between the middle prism and the two outer prisms. One color component is developed when the first dichroic layer reflects light onto the rear of the entry surface. The rear of the entry surface reflects that light into a pickup tube. Remaining light passes through that first dichroic layer and through the middle prism. A portion of the remaining light (the second color component) is reflected by the second dichroic layer out of the intermediate prism and into a second pickup tube. The light passing through both the first and second dichroic layers forms the third color component. The third color component passes into the third pickup tube along the same axis as the light entering the prism system. An assumption is made in both the Kishikawa and Miyaji prism systems that the pickup tubes may be placed at any location which is desirable in the camera. The space requirements are less stringent within television cameras than those, for example, on a mechanical transport which is moving documents past a read station.

These types of color separators shown in these patents are designed for a particular purpose which is to allow the reproduction of the color image by a television receiver. Color separators for this purpose are complicated by the fact that not only is the image reproduced sometime after separation but also the ultimate receiver is the human eye. Thus, the image reproduced by the television receiver must compensate for the physiological makeup of the human eye and the psychological problems inherent in the reproduction of images for viewing by human beings.

As optical character recognition (hereinafter referred to as "OCR") techniques have improved and the desirability of maximizing print contrast for mediums which may have many different colors in the background has increased. Therefore, it has been of increasing importance the OCR systems be color discriminatory and have the ability to maximize print contrast based on the separation of color. The Naval Electronics Laboratory Center has issued two annual reports (dated October 1975 and October 1976) concerning the use of different parts of the spectrum to yield an optimum contrast. The reports, however, do not go into specific color separator subsystems. Also, with the advent of new photocell devices which are more sensitive to light it is possible that the light reflected from a document can be split into several beams with each beam focused onto a different photocell device. The problem of locating a color separator or beam separator on most OCR transports is that the space between the area where the document is located with all the necessary mechanical hardware adjacent thereto for driving the document and the data lift is limited. It is highly desirable that the channels of the color or beam separator be directed in the same general direction although it is not necessary that they be directed in the same direction i.e., parallel. None of the prior construction of color or beam separators shows a design for a relatively simple prism which results in a distribution of components along axes which are generally in the same direction and is suitable for utilization on a transport.

SUMMARY OF THE INVENTION

In accordance with the present invention, two pairs of 30, 60 and 90 degree triangular prisms are positioned to form a beam separating prism system. Each prism of a prism pair are positioned with the sides opposite the 60 degree angle being adjacent but separated by a partially reflecting region. The adjacent surfaces of each pair are parallel. The prism pairs are situated adjacent with the side opposite the 30 degree angle of a prism of one pair parallel to and adjacent to a portion of the hypotenuse of one of the prisms of the other pair and with the hypotenuses of the two adjacent prisms are at an angle of approximately 60 degrees.

Light enters the prism separating system through an entry surface of one of the prisms and is intercepted by the partially reflecting region associated with the prism having the entry surface at an angle of approximately 60 degrees. The light entering the prism is not focused but rather is reflected light, such as that utilized by a typical imaging system, which can be visualized as located about an optical axis which is perpendicular to the entry surface and which intercepts the region at an angle of approximately 60 degrees. A portion of the light is transmitted through each partially reflecting region and a portion is reflected. The portion transmitted by this first region forms the first light component or beam. This first light component is reflected by the hypotenuse of the other prism opposite the prism of the pair having the entry axis. The hypotenuse intersects the first light component at an angle of approximately 30 degrees and reflects the component at an angle of approximately 30 degrees along an exit axis.

The light reflected from the first region is intercepted by the rear of the entry surface at an angle of approximately 30 degrees and is totally reflected thereby. The optical axis of this light reflected from the rear of the entry surface is parallel to exit axis of the first light component. The light reflected from the entry surface passes out of the prism pair and is intercepted by the other prism pair along the hypotenuse of the prism adjacent the pair having the entry surface at an angle of approximately 90 degrees.

The light passing from one prism pair to the other is intercepted by the second partially reflecting region at an angle of approximately 60 degrees. A portion of the light received by the region is reflected and a portion transmitted. The portion transmitted forms the second light component or beam which is intercepted by the hypotenuse of a prism at an angle of approximately 30 degrees and is reflected thereby out of the beam separating system. The light reflected from the second region forming the third light component is intercepted by the hypotenuse of the other prism of the pair and is totally reflected thereby out of the prism system. In order to create this total reflecting effect of the rear of the surface, it is necessary that an air gap be present between the two prisms system although they should be located closely adjacent. Thus, the optical axis of the second and third light components are parallel and lie at an angle of approximately 60 degrees to the optical axis of the first light component.

If desired the light received through the entry surface of the beam separating prism system can be divided into three color components as determined by the particular selection of dichroic coatings placed between the 30, 60, 90 degree prisms of each pair of prisms within the partially reflecting region. Each color component would contain the energy of certain wavelengths present in the light entering the beam separating prism system. Thus, the energy of the light entering the prism system is divided according to wavelength into three color components which are determined by the composition of the dichroic coatings forming the partially reflecting regions between the prisms of the two prism pairs. More particularly, a percentage of the energy of each wavelength is distributed into each of three color components. Trim filters can be provided along the surfaces through which the color components exit in order to provide additional control over the wavelengths contained in each color component. The exit axes of the three color components are of course, the exit axes of the light components as discussed above because, except for the dichroic coatings of the partially reflecting regions, the structure of the separating system remains the same.

The entry light is divided into three light components as discussed above with the exit axes of the light components being generally in the same direction with a maximum of approximately 60 degrees between the exit axes of the light components. This is important because of the space problems associating with OCR transports having drive mechanisms which move the material to be read past the read station where the beam separating system is located.

DETAILED DESCRIPTION OF THE PREFERRED EMBODIMENTS

Figure 1:
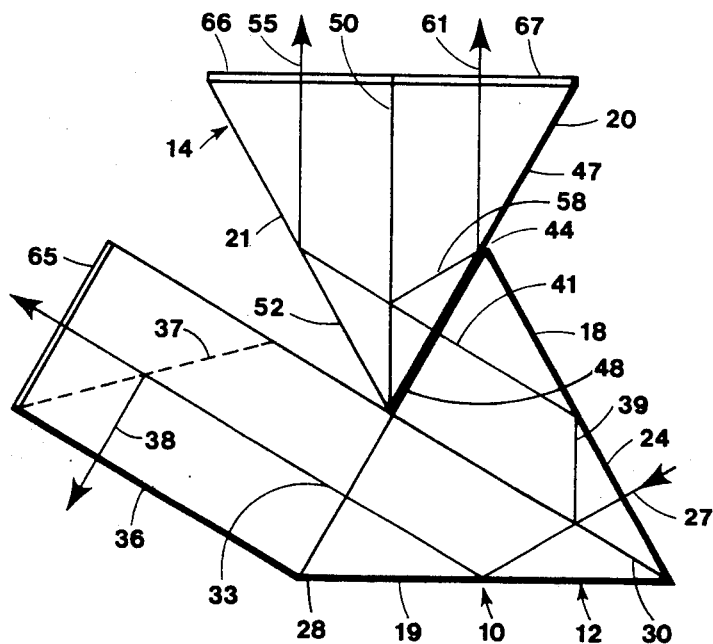
FIG. 1 is a side view of a beam separating prism system for an imaging system embodying this invention.

Referring to FIG. 1, a beam separating prism system (generally designated 10) of an imaging system, is shown therein. It being understood that the beam separating prism system described herein may be of various dimensions for operation within systems having varying requirements for field of view and other design criteria. The two prism pairs 12 and 14 are comprised of prisms 18 through 21 having a 30, 60, 90 degree triangular cross section as viewed from the side in FIG. 1. Prisms 18 and 19 comprise prism pair 12, and prisms 20 and 21 comprise prism pair 14. Prisms 18 through 21 are preferably, although not necessarily, of the same size. Each prism pair has its prisms situated with the sides opposite the 60 degree angle adjacent and parallel. The depth of the prisms can be varied as desired for the proper field of view.

Light forming an image is received by prism 18 through a nonreflecting entry surface 24 from a document or other object which is illuminated and as a result reflects light. The light is not focused and is not parallel. The term image refers to a two dimensional optical counterpart comprising light reflected from an object or surface to the actual object or surface. The term surface refers to a boundary which defines a plane. The term optical axis as used herein refers to the central axis of the light within the desired field of view. Thus, if the field of view were 36 degrees, the limits about the central axis would be 18 degrees on either side of the optical axis as measured from the focal point of the lens focusing the light onto a light sensor. The terms exit axis is used in much the same manner and refers to the central axis of the light comprising the desired field of view as it exits the prism system.

The optical axis of the light (or entry axis) received by the color separating prisms system 10 is shown by line 27 and is perpendicular to entry surface 24. Light emanates along the entry axis and enters through entry surface 24. The light is intercepted by a first partially reflecting region or zone 30 between prisms 18 and 19. A partially reflecting region or zone is defined as an area which reflects a certain percentage of light and transmits the remainder.

The optical axis coincident with line 27 is intercepted by the region 30 at an angle of approximately 60 degrees. The light transmitted through the region 30 along line 27 forms a first light component. The first light component is intercepted by a surface 28 of prism 19 at an angle of approximately 30 degrees and is totally reflected thereby along an exit axis shown by line 33 because the angle of incidence is below the critical angle.

Another prism 36 can be located along the exit axis if it is desired to equalize the length of the optical paths through the beam separating system. If it is not desired to do so, then prism 36 can be omitted. Prism 36 has a rectangular cross section with one of the smaller sides adjacent prism 19 along line 33 with the adjacent sides parallel. If it is desired to incorporate another exit axis within the beam separating system, the prism 65 can be divided into two prisms with partially reflecting region 37 therebetween. Region 37 intercepts line 33 at an angle of approximately 45 degrees and reflects approximately 50 percent of the light received along line 38 which forms an exit axis. The reflection of region 30 would be changed so that it reflects 50 percent of the light received which will provide approximately same percentage of the light received along line 27 by surface 24 along each exit axis. However, the percentages can be varied as desired.

A focusing lens along axis 33 (not shown) collects and focuses the first light component onto a light sensor (not shown) such as a self-scanning array of photocells. The light which is reflected from the first region 30 is intercepted by the entry surface 24 at an angle of approximately 30 degrees. Since this is below the critical angle of reflection for the air-glass boundary layer, the rear of surface 24 reflects all of the light which was reflected from region 30. The reflected light by region 30 first travels along an optical axis generally described by line 39 and is reflected from entry surface 24 along an optical axis shown as line 41 in FIG. 1. Region 30 reflects approximately ⅔ of the light it receives.

The type of glass which is preferred for the prisms is crown glass which is an alka-lime silicate optical glass having a relatively low index of refraction, although any suitable optical quality glass could be utilized. Light reflected along the optical axis indicated by line 41 passes out of the prism 18 at an angle of approximately 90 degrees across a slight air gap 44 (the function of which will be described hereinafter). The light after crossing the air gap 44 is intercepted by a surface 47 of prism 20 at an angle of approximately 90 degrees. A portion of the hypotenuse of prism 20, which is surface 47, is located adjacent to the surface 48 of prism 18 which is opposite to the 30 degree angle of prism 18. The hypotenuses of prisms 18 and 20 which are surfaces 24 and 47, respectively, are set at an angle of 60 degrees. The second partially reflecting region 50 between prisms 20 and 21 of the prism pair 14 intercepts the optical axis of the light reflected from the entry surface 24 at an angle of approximately 60 degrees. This region is similar in function to the partially reflecting region 30 in that it is also formed of a laminate of films which has a refracted index preset at a generally known value to permit the passage of one light component and to reflect other light components. The partially reflecting region 30 reflects approximately 50 percent of the light it reviews.

The light transmitted by the region 50 forms a second light component which is intercepted along line 41 which at this point represents the optical axis of the second light component, by a surface 52 of prism 21 at an angle of approximately 30 degrees. The light transmitted by region 50 is reflected by the rear of the surface 52 because of the air-glass boundary having a critical angle (as discussed above) of greater than 30 degrees along an optical axis shown by line 55. The optical axis represented by line 55 is the second exit axis for the second light component of the beam separating prism system 10. The light reflected from region 50 forms the third light component and is intercepted by surface 47 of prism 20. The optical axis of the reflected light shown generally by line 58 intercepts surface 47 at an angle of approximately 30 degrees, and because the angle is less than the critical angle of the boundary, the light is reflected from the rear of surface 47 along line 61 which represents the third optical exit axis. The second and third light components are directed in the same direction and their optical axes are parallel. Air gap 44 is provided to increase the critical angle and thereby reflect the light along line 61 intercepted by surface 47 received along the optical axis shown by line 58. The optical exit axes shown by lines 55 and 61 are parallel and are at a 60 degree angle to the optical exit axis represented by line 33. Imaging lenses (not shown) are located also along lines 55 and 61 to focus the color components onto light sensors such as self scanning photocell arrays. If it is desired to further modify the percentages of light present in each color component, trim filters 65 through 67 may be added.

Thus, the light entering entry surface 24 is split into three light components having exit axes represented by lines 33, 55 and 61. The energy entering surface 24 is divided between the three exit axes based on the wavelengths present therein.

Figure 2:
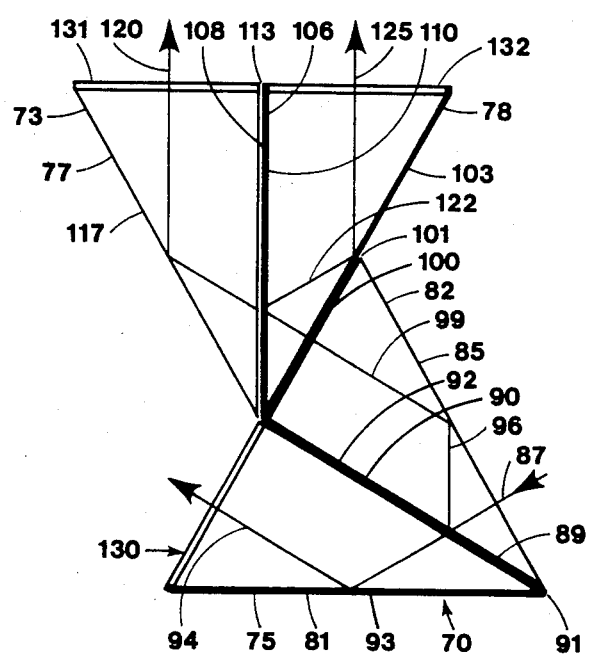
FIG. 2 shows a second embodiment of the beam separator of the present invention with air gaps provided between all of the prisms within the system.

The color separating system 70 shown in FIG. 2 has two prism pairs 73 and 75, prism 73 is comprised of prisms 77 and 78, and prism pair 75 is comprised of prisms 81 and 82. The prisms have a triangular cross section which has angles 30, 60, and 90 degrees. The prisms of each prism pair are located with their surfaces opposite the 60 degree angle adjacent and parallel, but spaced.

Light reflected from the document or light comprising any image enters prism 82 through entry surface 85. The light emanates along and about an optical axis represented by line 87 to surface 85. The optical axis represented by line 87 intercepts a dichroic region 89 at an angle of approximately 60 degrees. Dichroic region 89 is comprised of a laminate 90 of films (or coatings) and a slight air gap 91. A dichroic region or zone is defined as an area which reflects light of certain wavelengths and transmits light of other wavelengths. Thus, a dichroic region acts as a mirror to some wavelengths while it is transparent to others. In other words, the dichroic region or zone is wavelength discriminating. However, in reality percentages of most wavelengths are both transmitted and reflected. The dichroic region is comprised of dichroic layers or laminate formed by films having a reflection index preset at a generally known value permitting the passage of color components other than certain color components.

The air gap 91 is provided in this embodiment to increase the wavelength selectivity of the dichroic region, i.e., provide greater control over the percentage of each wavelength distributed between the three color components. The term dichroic region or zone as used herein includes the dichroic layers and the air gap, if desired. The laminate 90 is cemented to the surface 92 of prism 85.

A portion of the light is transmitted by the dichroic region into prism 81, intersects the rear of a surface 93 within prism 81 at an angle of approximately 30 degrees, and is totally reflected thereby along an exit axis represented by line 94. This light forms a first color component which can be red or blue as desired. The light reflected by dichroic region 89 intersects the rear of entry surface 85 at an angle of approximately 30 degrees and is totally reflected thereby because the angle of incidence is less than the critical angle. Line 96 represents the optical axis of the reflected light and line 99 represents the optical axis of the light reflected from the rear of surface 85. Light reflected along optical axis 99 passes out of surface 100 of prism 82 at an angle of approximately 90 degrees across a slight air gap 101 and into prism 78 through nonreflecting surface 103 at an angle of approximately 90 degrees to surface 103.

The prism pairs are situated with the surface 103 of prism 78 parallel to surface 100 of prism 82. Surface 103 is the hypotenuse of prism 78 and surface 100 is opposite the 30 degree angle of prism 82.

The light is intercepted by a dichroic region 106 between prisms 77 and 78 at an angle of approximately 60 degrees. Dichroic region 106 comprises a laminate 108 of films having a preset refractive index at a generally known value as permits a passage of certain light components (or wavelengths) and the reflection of others. This laminate is affixed or cemented to surface 110 of prism 78. A slight air gap 113 is located between laminate 108 and prism 77.

The light transmitted through dichroic region 106 forms a second color component which is intercepted by surface 117 of prism 77 at an angle of approximately 30 degrees. The second color component is green. The light is totally reflected from the rear of surface 117 along an optical exit axis defined by line 120. Optical axis defined by line 120 is the second exit axis and is the axis along which the second color component exits the color separating system 70. Light reflected from dichroic region 106 is intercepted by the rear of surface 103 at an angle of approximately 30 degrees, which is below the critical angle (as discussed above), and is totally reflected thereby. The light reflected from dichroic region 106 has an optical axis shown by line 122 and the light reflected from the rear surface 103 has an optical axis shown by line 125. The optical axis defined by line 125 is the exit axis of the third light component which is comprised of the light reflected by dichroic region 106. The third component can be blue or red. If the first color component is red, the third color component must be blue, and, if the first color component is blue, the third color component must be red. Thus, the light entering surface 85 of prism 82 along the optical axis shown by line 87 is divided into three color components which exit the color separating prism system 70 along the optical exit axes represented by lines 94, 120, and 125. Lines 120 and 125 are parallel and are at an angle of 60 degrees to line 94.

Thus, the energy present in the light entering surface 85 is divided into three color components based on the wavelengths present in the entering energy. If it is desirable to further control the wavelengths present along the exit axes, trim filters 130 through 132 may be provided to intercept the light exiting the prisms along the three exit axes represented by lines 94, 120, and 125, respectively. Imaging lenses and light sensors (not shown) are positioned along each of the exit axes. Each of the imaging lens and light sensor arrangements can be of the type generally known in OCR systems. The dichroic region can in some applications have the air gap omitted.

In summary, light reflected from a document or other image is separated into several light components, for utilization within an OCR imaging system. The separating can be determined by the wavelengths present in the light reflected from the document or other image. The light which traverses the beam separating prism system can be divided into three color components having three exit axes, two of which are parallel and the other being at a 60 degree angle to the other two exit axes. The beam separating prism system of the present invention can be located within a small space as is necessary on most transports which are moving documents. The three exit axes are fairly close to the same general direction so that the arrays or other photosensors can be conveniently located on the transport. The beam separating is accomplished by utilizing several regions which are wavelength discriminating. Other exit axis can be added.

Having described the invention in connection with certain specific embodiments thereof, it is to be understood that further modifications may now suggest themselves to those skilled in the art. It is intended to cover all such modifications such as fall within the scope of the appended claims.

What is claimed is:

1. A beam separating prism system for an imaging system comprising two pairs of prisms, each pair having a partially reflecting region located between parallel adjacent surfaces of the prisms, one pair of prisms located adjacent to said other pair and having an air gap there between, a first prism of said one pair of prisms positioned to receive light along an entry axis through a nonreflecting entry surface, the region of said one pair intercepting said entry axis at an angle of approximately 60 degrees and reflecting a second and third light component and transmitting a first light component, a second prism of said one pair having a totally reflecting surface intercepting said entry axis at an angle of approximately 30 degrees to reflect the first light component from said entry axis along a first exit axis parallel to the parallel faces of said one pair of prisms, said first prism having a total reflecting surface located on the rear of said entrance surface to reflect said second and third light components along a second axis parallel to said first exit axis, the region of the other prism pair intercepting said second axis at an angle of approximately 60 degrees reflecting the third light component and transmitting the second light component, said other prism pair comprising a third and fourth prisms, said third prism located adjacent said first prism having a totally reflecting surface located on the rear of the surface intercepting said second axis to intercept the third light component at an angle of approximately 30 degrees for reflecting the third light component along a third exit axis in a certain direction, said fourth prism having a totally reflecting surface intercepting said second axis at an angle of approximately 30 degrees to reflect the second light component along a second exit axis parallel to said third exit axis in said certain direction and at an angle of approximately 60 degrees to said first exit axis.

2. A color separating system as set forth herein in claim 1 wherein said first and second regions comprise a laminate of dichroic films and an air gap.

3. The color separating system as set forth in claim 2 wherein trim filters are provided along each exit axis for further controlling the color present in each color components.

4. Prism system as set forth in claim 1 including a fifth prism having a rectangular cross section and located along said first exit axis.

5. Prism system as set forth in claim 4 wherein said fifth prism includes a third partially reflecting region at an angle of approximately 45 degrees to said first exit axis.

6. A color separating prism system as set forth in claim 4 wherein said first and second dichroic regions comprise a laminate of dichroic films and an air gap.

7. A color separating prism system as set forth in claim 4 including trim filters provided along each exit axis to further control the wavelengths present in each color component.

8. Color separating prism system as set forth in claim 7 wherein said parallel adjacent surfaces of the prisms of each pair are opposite the 60 degree angle.

9. Color separating prism system as set forth in claim 7 wherein the hypotenuse of said third prism is adjacent and spaced from surface of third prism opposite 30 degree angle thereof.

10. Prism system as set forth in claim 9 wherein said first and second regions include a laminate of dichroic films being wavelength discriminating.

11. Color separating prism system as set forth in claim 4 wherein said second and third exit axes are parallel and said first exit is at an angle of approximately 60 degrees to said second and third exit axes.

12. A color separating prism system as set forth in claim 4 wherein said first, second, third and fourth prisms have a 30, 60, 90 degree triangular cross section.

13. A color separating prism system for an imaging system including four right angle triangular prisms dichotomizing an image emanating along an entry axis into three color components comprising a first prism having a nonreflecting entry surface intercepting said entry axis in perpendicularity thereto, a first dichroic region located adjacent another surface of said first prism intercepting said entry axis at an angle of approximately 60 degrees, said first dichroic region transmitting a first color component and reflecting the remaining light, a second prism having a nonreflecting surface adjacent said first dichroic region intercepting said entry axis and having a total reflecting surface for reflecting said first component along a first exit axis, said entrance surface intercepting and reflecting said remaining light at an angle of approximately 30 degrees toward a second dichroic region at an angle of approximately 60 degrees thereto, said second dichroic region transmitting a second light component and reflecting a third light component, said second dichroic region being located intermediate a third and fourth prisms, said third prism having a nonreflecting surface located adjacent and space from said first prism to receive said remaining light, the rear of said entry surface intercepting said third color component at an angle of 30 degrees to reflect said third color component along a third exit axis, said fourth prism having a totally reflecting surface intercepting said second component at an angle of approximately 30 degrees to reflect said second color component along a second exit axis.

14. A color separating prism system for an imaging system utilizing light reflected from a document focused onto light sensors comprising: a plurality of prisms located intermediate said document and said light sensor and traversed by reflected light from said document, each prism of said plurality of prisms having a 30, 60, 90 degree triangular cross section; a first prism receiving said reflected light through the hypotenuse thereof, a second prism of said plurality of prisms, said first and second prisms having the surfaces opposite the 60 degree angles thereof adjacent and parallel with a first dichroic region located there between, said first dichroic region transmitting a first color component and reflecting the remaining light, a third prism having the hypotenuse thereof located adjacent and spaced from the surface of said first prism opposite the 30 degree angle thereof with the hypotenuse of said first prism at an angle of approximately 60 degrees to the hypotenuse of said third prism, a fourth prism of said plurality of prisms, said third and fourth prisms having the surfaces opposite the 60 degree angles adjacent and parallel with a second dichroic region located there between, said second dichroic region transmitting a second color component and reflecting other light for separating light received at said entry surface into three color components.

15. Prism system as set forth in claim 14 wherein each of said first and second regions include an air gap.

16. A beam separating prism system for an imaging system utilizing reflected light from an object comprising: a plurality of prisms and traversed by reflected light from said document, each prism of said plurality of prisms having a 30, 60, 90 degree triangular cross section; a first prism receiving said reflected light through the hypotenuse thereof; a second prism of said plurality of prisms, said first and second prisms having the surfaces opposite the 60 degree angles thereof adjacent and parallel with a first partially reflecting region located there between, said first region transmitting a first light component and reflecting the remaining light; a third prism having the hypotenuse thereof located adjacent and spaced from the surface of said first prism opposite the 30 degree angle thereof with the hypotenuse of said first prism at an angle of approximately 60 degrees to the hypotenuse of said third prism; a fourth prism of said plurality of prisms, said third and fourth prisms having the surfaces opposite the 60 degree angles adjacent and parallel with a second partially reflecting region located there between, said second region transmitting a second light component and reflecting other light for separating light received at said entry surface into three light components.

* * * * *